(12) United States Patent
Sichler et al.

(10) Patent No.: US 6,758,237 B2
(45) Date of Patent: Jul. 6, 2004

(54) TAPPING VALVE (75) Inventors: Wolfgang Sichler, Mannheim (DE);
Matthias Fastanz, Mannheim (DE);
Fabian Maier, Westheim (DE);
Gerhard Mueller, Mannheim (DE)

(73) Assignee: Friatec Aktiengesellschaft, Mannheim (DE)

(*) Notice: Subject to any disclaimer, the term of this patent is extended or adjusted under 35 U.S.C. 154(b) by 0 days.

(21) Appl. No.: 10/319,810

(22) Filed: Dec. 16, 2002

(65) Prior Publication Data

US 2003/0136445 A1 Jul. 24, 2003

Related U.S. Application Data

(63) Continuation of application No. PCT/EP01/06774, filed on Jun. 15, 2001.

(30) Foreign Application Priority Data

Jun. 16, 2000 (DE) .......................................... 100 28 933

(51) Int. Cl.$^7$ .......................... B23B 41/08; F16K 43/00; F16L 41/04
(52) U.S. Cl. ........................... 137/318; 30/93; 408/102; 408/207; 408/226
(58) Field of Search .......................... 137/318; 408/101, 408/102, 137, 207, 226; 30/93; 411/413, 414, 415

(56) References Cited

U.S. PATENT DOCUMENTS

| | | | | |
|---|---|---|---|---|
| 2,335,741 A | * | 11/1943 | Contaldi | 408/226 |
| 2,735,116 A | * | 2/1956 | Mueller | 408/226 |
| 2,740,974 A | * | 4/1956 | Lewis | 408/226 |
| 2,839,075 A | * | 6/1958 | Mueller | 137/318 |
| 3,068,724 A | * | 12/1962 | Mueller | 137/318 |
| 3,176,708 A | * | 4/1965 | Shields | 137/318 |
| 3,756,261 A | * | 9/1973 | Minchhoff | 137/318 |
| 4,258,742 A | | 3/1981 | Louthan et al. | 137/318 |
| 4,655,480 A | * | 4/1987 | Thalmann | 137/318 |
| 5,152,642 A | * | 10/1992 | Pitts et al. | 408/226 |
| 5,234,293 A | * | 8/1993 | Mena | 408/226 |
| 5,345,964 A | | 9/1994 | Friedel | 137/318 |
| 5,348,045 A | * | 9/1994 | Serve | 134/318 |
| 5,577,529 A | * | 11/1996 | Katz | 137/318 |
| 5,732,732 A | * | 3/1998 | Gross et al. | 137/318 |
| 5,975,117 A | * | 11/1999 | Schweitzer et al. | 137/318 |

FOREIGN PATENT DOCUMENTS

| | | |
|---|---|---|
| DE | 9308621 | 10/1994 |
| EP | 0572817 | 5/1993 |
| EP | 0845630 | 6/1998 |

* cited by examiner

Primary Examiner—George L. Walton
(74) Attorney, Agent, or Firm—Crowell & Moring LLP (57) ABSTRACT

A tapping valve having a housing which can be electrically welded to a pipe and which includes a connection piece (2) with a drill (24) therein for drilling the pipe. The connection piece has an inner surface (34). The drill or a bushing (70) in which the drill can be moved axially by a threaded connection (74, 76; 80, 82) is provided with an external thread which engages the inner surface of the connection piece. Inner surface (34) is constructed such that it is initially cylindrical adjacent the external thread (32) and an inner thread can be formed in the inner surface (34) using the external thread (32) by rotating the drill (24) or the thread (70) in an axially forward direction (30). The tapping valve is easy to manufacture and yet offers a high degree of functional reliability.

20 Claims, 11 Drawing Sheets

TAPPING VALVE

CROSS REFERENCE TO RELATED APPLICATIONS

This application is a continuation of international patent application No. PCT/EP01/06774, filed Jun. 15, 2001, designating the United States of America and published in German as WO 01/96778, the entire disclosure of which is incorporated herein by reference. Priority is claimed based on Federal Republic of Germany patent application No. DE 100 28 933.9, filed Jun. 16, 2000.

BACKGROUND OF THE INVENTION

The present invention relates to a tapping valve comprising a housing which can be connected to a pipe and a connection piece with a drill arranged therein for tapping the pipe.

Friedel, U.S. Pat. No. 5,345,964 (=EP 572,817) discloses a tapping valve including a housing which can be connected to a pipe, particularly by welding. The housing of the valve and the pipe are preferably made of a weldable plastic, particularly polyethylene. A saddle of the housing includes a heating coil for electric welding. The housing further comprises a connection piece in which a metal guide sleeve is integrated, particularly by injection molding. Along its outer surface, the guide sleeve has ribs, pins or the like to secure it rotationally and axially in the plastic material of the connection piece. The guide sleeve is provided with an internal thread for a drill whose external thread engages this internal thread. After the valve and the pipe have been joined together, the guide sleeve makes it possible to drill a hole into the pipe. Furthermore, a branch socket to connect a branch conduit is coupled to the connection piece. This valve makes it possible to tap a pipe under pressure, i.e., without having to block the medium flowing through the pipe, particularly water or gas. The normal pressure in water supply networks can be as high as 16 bar and in gas supply networks 10 bar.

Louthan et al., U.S. Pat. No. 4,258,742 discloses a plastic tapping valve, which does not include a guide sleeve for the drill. The drill is screwed directly into an internal thread of the connection piece. The internal thread is formed in the connection piece after production or injection molding of the plastic housing, and the drill is subsequently screwed into the internal thread, which extends over the entire length of the connection piece. Tapping of pipes under pressure is not readily possible with such a tapping valve, since after tapping, the flowing medium under pressure can inadvertently escape through the thread area between drill and connection piece due to manufacturing tolerances. If the specified tolerances are too tight, substantial torques will be required to carry out the tapping, so that there is a possibility of damage to the tapping valve or even the pipe.

SUMMARY OF THE INVENTION

Accordingly, it is an object of the invention to provide an improved tapping valve.

Another object of the invention is to provide a tapping valve which assures a high degree of functional reliability without adding a lot of structural complexity.

A further object of the invention is to provide a functionally reliable tapping valve which can be manufactured at low material and production cost.

An additional object of the invention is to provide an improved pressure tapping valve which enables pipes to be tapped under pressure without any problem.

It is also an object of the invention to provide a tapping valve which requires only a low torque to tap the pipe.

Yet another object of the invention is to provide a tapping valve which assures a high degree of functional reliability.

These and other objects are achieved in accordance with the present invention by providing a tapping valve comprising a housing which can be connected to a pipe, and a connection piece with a drill arranged therein for tapping the pipe, wherein the connection piece has an initially cylindrical inner surface, and the drill or a sleeve in which the drill can be moved axially by a threaded connection, has an external thread which engages the inner surface of the connection piece, and rotation of the drill or sleeve in a forward direction causes the external thread on the drill or sleeve to form an internal thread in the inner surface of the connection piece.

The tapping valve according to the invention is distinguished by its simple, functionally suitable structure. It permits tapping of a pipe with a high degree of functional reliability, including the tapping of pipes under pressure. The drill, or a sleeve that is provided to guide the drill, has a self-cutting thread, which during the tapping process directly cuts or presses into the otherwise cylindrical interior surface of the connection piece. The flanks of the thread are configured with an acute angle to facilitate penetration into the inner surface of the connection piece. The plastic thus displaced flows into the root of the thread where it provides a seal. The penetration depth of the flanks of the thread into the inner surface of the connection piece is selected so as to ensure an automatic seal against the medium under pressure underneath the drill.

At the front end of the thread, in the direction of forward movement, the external thread diameter is specified to be larger by a predetermined amount than the diameter along the rest of the thread. Thus, the front end of the thread causes an increased displacement of plastic, particularly polyethylene, compared to the rest of the thread area, which is significantly longer. This substantially reduces the torque required to screw the thread into the plastic since the long thread area with the smaller diameter, compared to the front thread area, easily passes through the thread that has previously been cut or pressed into the plastic of the inner surface of the connection piece by the larger diameter front thread area.

Compared to tapping valves that contain a prefabricated thread in the inner surface of the connection piece, manufacturing tolerances are practically insignificant, and a reliable seal is ensured between the external thread of the drill or the sleeve and the thread that is produced in the inner surface of the connection piece as the drill or sleeve is screwed in. When the drill or sleeve is reversed, its external thread automatically finds the previously created thread in the inner surface of the connection piece, so that the drill or sleeve can return to the desired end position while still being reliably sealed.

In one advantageous embodiment, the drill or the sleeve which receives the drill is directly integrated into the connection piece during production of the tapping valve. It is particularly preferred to integrate the drill or sleeve into the connection piece by injection molding. The inner surface of the connection piece into which the thread is later to be cut is cylindrical. Thus, the inner surface of the connection piece comprises an integrated thread area corresponding to the thread of the drill or the sleeve.

During tapping by the drill, or during rotation of the sleeve, the drill or sleeve is screwed out of the molded thread area of the connection piece, also referred to as a mandrel, into the cylindrical inner area of the connection piece. According to the invention, the driving thread is cut in this area. The displaced plastic material is compressed into the thread flanks and is formed into a thread. As the drill or sleeve is reversed, the thread flanks again cut into the precut thread profile in the inner surface of the connection piece and compress the plastic material in the flanks. This ensures a reliable seal even during reverse motion.

The thread geometry according to the invention prevents chip formation, which would normally result in a metric ISO or fine-pitch thread. It should be noted that in a tapping valve, chip formation during or after the tapping process or rotation of the sleeve is not acceptable, as it would contaminate the pipe network. Advantageously, in the forward movement direction, in front of the first thread area with the enlarged thread diameter, there is a thread inlet area in which the diameter of the "thread tooth" increases continuously starting from the thread root diameter of the drill or sleeve, until the outside diameter of the first area is reached. Consequently, there is no cutting edge or the like, which would lead to an undesired chip-forming removal of plastic.

The thread inlet area extends over a predetermined circumferential angle, preferably at least 90°, and advantageously at least 180°. Advantageously, the thread inlet at maximum extends up to a circumferential angle of 360°, preferably up to 180°.

The thread is initially cut into the cylindrical inner surface of the connection piece or mandrel by means of the first thread area, and after being formed is compressed in the subsequent turns of the second thread area. According to the invention, the plastic thus displaced is compressed in the thread flanks and is formed as a thread in the inner surface of the connection piece. This achieves an economically efficient production of the tapping valve overall and ensures the sealing function as the drill or sleeve is moved while subjected to the pressure of the medium flowing through the tapped pipe after the pipe has been tapped.

Further aspects and preferred embodiments of the invention are described hereinafter.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
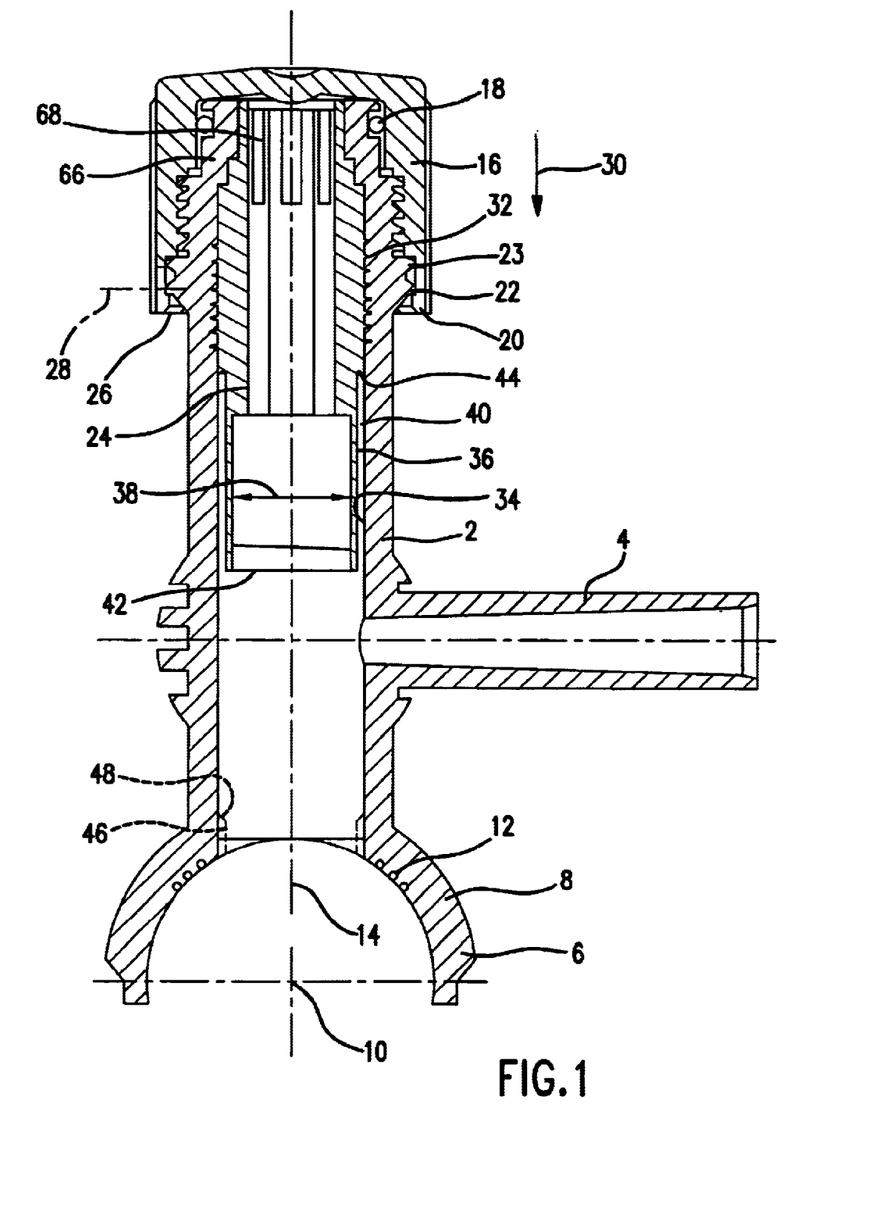
FIG. 1 shows a cross section through a tapping valve according to the invention with an integrated drill.

FIG. 1 is a section through a tapping valve having a plastic housing comprising a connection piece 2 with a lateral branch socket 4 and a saddle piece 6. The saddle piece 6 has a semi-cylindrical inner surface 8 coaxial to a longitudinal axis 10 and extends orthogonally to the drawing plane of the figure. In the area of the inner surface 8, a welding coil 12 is arranged coaxially to a connection piece axis 14. This welding coil 12 is used in known manner to create a tight connection with a pipe (not shown) having a longitudinal axis which coincides with longitudinal axis 10.

At the upper end of the connection piece 2, also referred to as a mandrel, a cap 16 is provided, which tightly seals the connection piece or mandrel 2 after the tapping valve has been connected to the pipe and the pipe has been tapped. To this end, an annular groove at the upper end of connection piece 2 contains a sealing ring 18, which contacts the inner surface of cap 16 to form a seal.

As may be seen, cap 16 is secured to the end of the connection piece via a threaded connection. In the position shown, the cap is prevented from becoming detached by means of interlocking elements 20, 22. The figure depicts the state or position of cap 16 after tapping and subsequent retraction of a drill arranged in the interior of connection piece 2. The tapping valve is assembled at the factory and delivered to a user such that the lower edge 26 of cap 16 assumes the position indicated by broken line 28. The cap locking element 20 engages with another locking element 23 of the connection piece. Temporary locking of the cap is ensured in this position. By applying a predefined torque, however, the locking connection can easily be detached by hand and cap 16 rotated upwardly counter to the direction of the arrow 30 shown in the drawing and removed from connection piece 2. Drill 24 then is rotated by a corresponding tapping tool and in order to tap the pipe is moved axially relative to the connection piece axis 14 in the direction of arrow 30.

Drill 24 is integrated into connection piece 2 at the factory when the tapping valve is produced, e.g. when the housing is injection molded. Drill 24 as well as welding coil 12 are suitably positioned and fixed in place in the injection mold, and the plastic housing, made particularly of polyethylene, is injection molded around it in a known manner. The drill has a special thread 32, further described below, which is embedded in the plastic of the connection piece and which after production and until tapping, secures the drill in the depicted position at the upper end of the connection piece. Toward the lower end, connection piece 2 has a cylindrical inner surface 34. Below the special thread 32, drill 24 has a cylindrical part 36 with a reduced outside diameter 38 such that there is an annular gap 40 relative to the cylindrical inner surface 34. The lower end 42 of the drill is configured in known manner as a cutting or drilling edge to tap the aforementioned pipe. Between the cylindrical part 36 and thread 32, there is a stop collar 44, which during tapping, after a defined penetration depth of drill 24 has been reached, rests against the crown of the pipe, which is welded to the saddle 6 by means of welding coil 12. This stop collar 44 prevents drill 24 from penetrating further into the pipe and piercing the opposite pipe wall. A circumferential undercut at the stop collar prevents the stop from cutting into the pipe wall with continued rotation. Instead, the plastic is compressed and further rotation is prevented by a stop, or by an increase in the torque, which is directly noticeable to the installer.

As the drill is reversed against the direction of the forward motion indicated by arrow 30, the flanks of thread 32 again cut into the precut thread profile, which is now present in the inner surface 34, and compress the plastic material in the flanks. This ensures a seal in upward direction during and after the movement of the drill and very reliably prevents the medium under pressure in the tapped pipe from escaping.

It should be noted that the inner surface 34 of connection piece 2 is cylindrical over a defined length, which is at least as long as the path required to advance drill 24 from the depicted upper initial position to complete the through-bore in the wall of the pipe. If desired, a shoulder or annular collar 46 (shown in broken lines) may be provided at the lower end of connection piece 2 in the area of the saddle piece for stop collar 44 of drill 24. Within the scope of the invention, shoulder 46 can furthermore be configured as a valve seat 48, particularly by beveling at the top surface. Stop collar 44 is also formed conical to serve as a valve seat, in order to obtain an additional valve function and blocking function when the drill is in the lower position.

Connection piece 2 at its upper end has an area 66 with a smaller diameter than the inner surface 34. This area 66, which tapers inwardly, forms a stop for drill 32, which also has a reduced diameter at its upper end. This ensures that even in the worst case, the pressure inside the pipe cannot push drill 24 upwardly out of the connection piece after tapping. Advantageously, area 66 and, similarly, the upper end of drill 24 have a two-step tapered design. Furthermore, drill 24 at its upper end on the inside comprises engagement areas configured as a polygon or the like, or surfaces 68 for a corresponding tapping tool, which is used to induce the rotary motion and the axial forward motion of drill 24.

Figure 2:
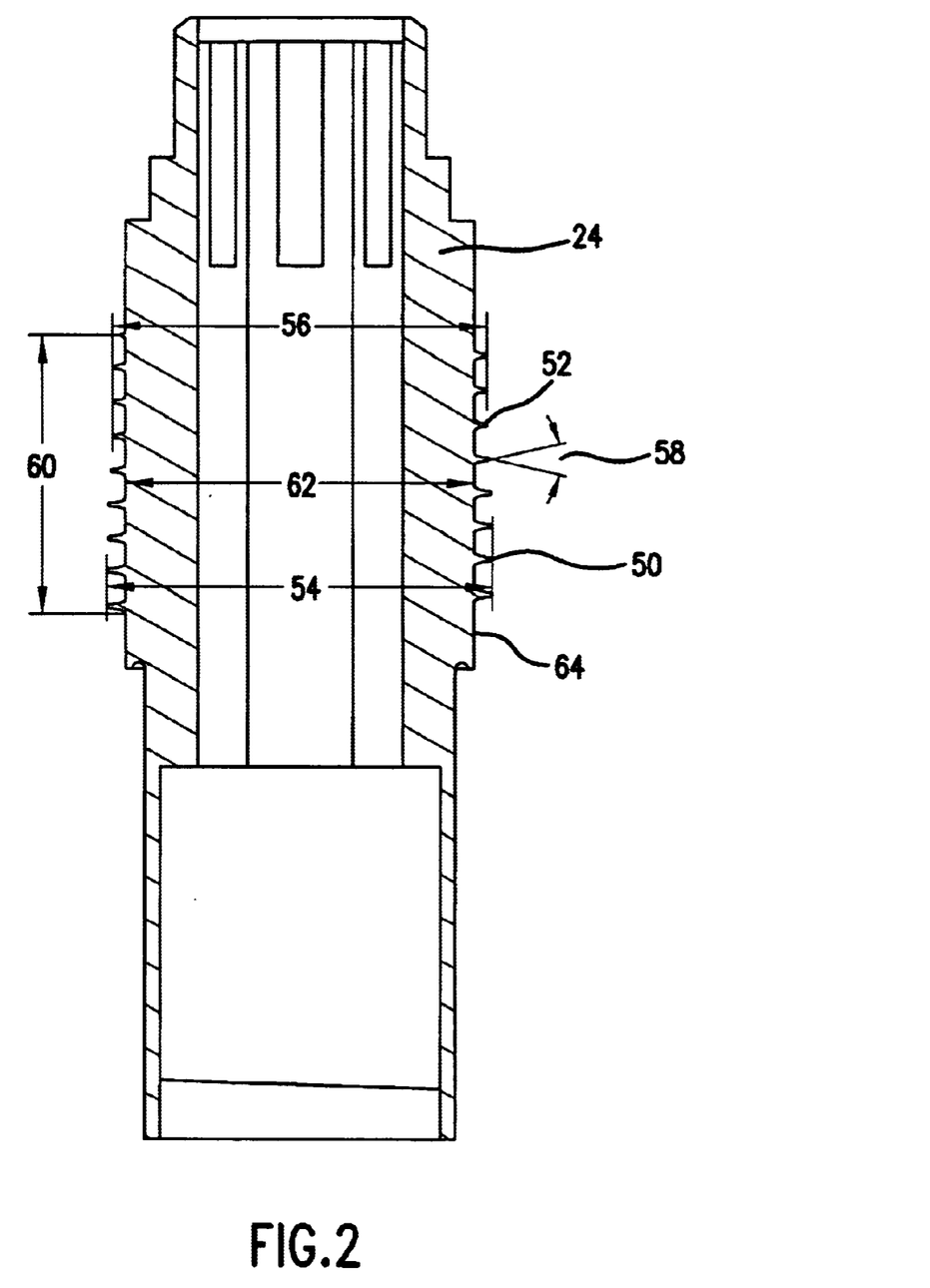
FIG. 2 shows a cross section through the drill according to FIG. 1.

FIG. 2 shows an axial section through drill 24, which is preferably made of metal. The thread includes a first thread area 50 as seen in the direction of the forward movement indicated by arrow 30 and an adjoining second thread area 52 behind area 50 in the direction of movement. The first thread area 50 has an outside diameter 54 and the second thread area 52 an outside diameter 56. The thread flanks form an acute angle 58. The first outside diameter 54 is larger by a predefined amount than the second outside diameter 56. The difference between the two diameters 54 and 56 is preferably between 0.3 and 0.8 mm, particularly preferably between 0.4 and 0.7 mm, and especially preferably is approximately 0.5 mm. Consequently, as drill 24 advances, a thread is initially cut in the cylindrical inner surface 34 and after being formed is compressed by the following turns. The first thread area 50 causes an increased displacement of the plastic of cylindrical inner surface 34, such that the second thread area passes readily through the precut thread in inner surface 34 of connection piece 2. In the end result, due to the inventive embodiment of the thread of the drill, the torque is significantly reduced compared to a drill whose thread has the same diameter over its entire length. However, due to the total length 60 of the thread, secure coaxial guidance of drill 24 within connection piece 2 is nevertheless assured.

The first thread area 50 comprises at least one turn extending 360° around axis 14, which coincides with the axis of the connection piece. Advantageously, the first thread area 50 comprises two turns, such that the thread in the first thread area 50 has a "thread tooth" that extends through a circumferential angle of at least approximately 720°. The number of turns in the second thread area with the reduced outside diameter 56 is substantially greater than the number of the one or more turns in the first thread area 50. Preferably the second thread area 52 comprises at least 4 turns. In the preferred embodiment shown, there are five turns in the second thread area 52. The root of the thread has a diameter 62, which preferably is substantially constant over the entire length 60.

In the direction of forward movement 30 in front of the first thread area 50, a thread inlet 64 is provided, in which the outside diameter of the thread present there increases preferably continuously starting from root diameter 62 up to outside diameter 54. Thread inlet 64 preferably extends at minimum through a 90° to 180° circumferential angle and/or at maximum through a 360° to 180° circumferential angle. Due to this thread inlet, the thread does not have cutting edges or the like, which would cause undesirable chip formation.

Figure 3:
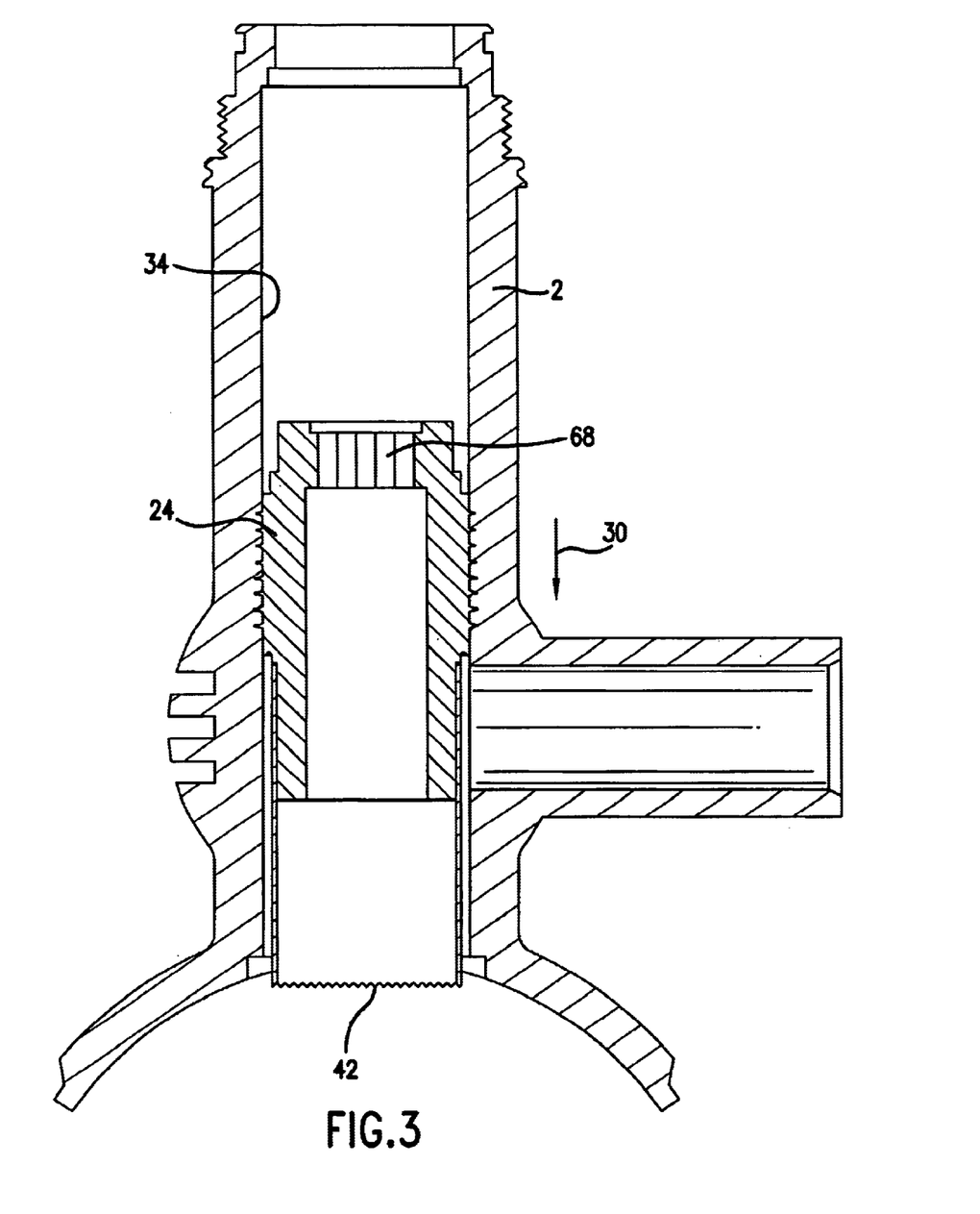
FIG. 3 shows a cross section through a tapping valve similar to FIG. 1, with the drill depicted in a position prior to tapping a pipe.

FIG. 3 schematically shows an axial section through the tapping valve. The drill 24 is moved axially downward in accordance with the above description while forming the internal thread of inner surface 34 of connection piece 2. The front end 42 of drill 24 is in the position where tapping of the pipe (not shown) starts. It should be noted that the cap described with reference to FIG. 1 is removed from connection piece 2, such that the tapping tool can be engaged with engagement area 68.

Figure 4:
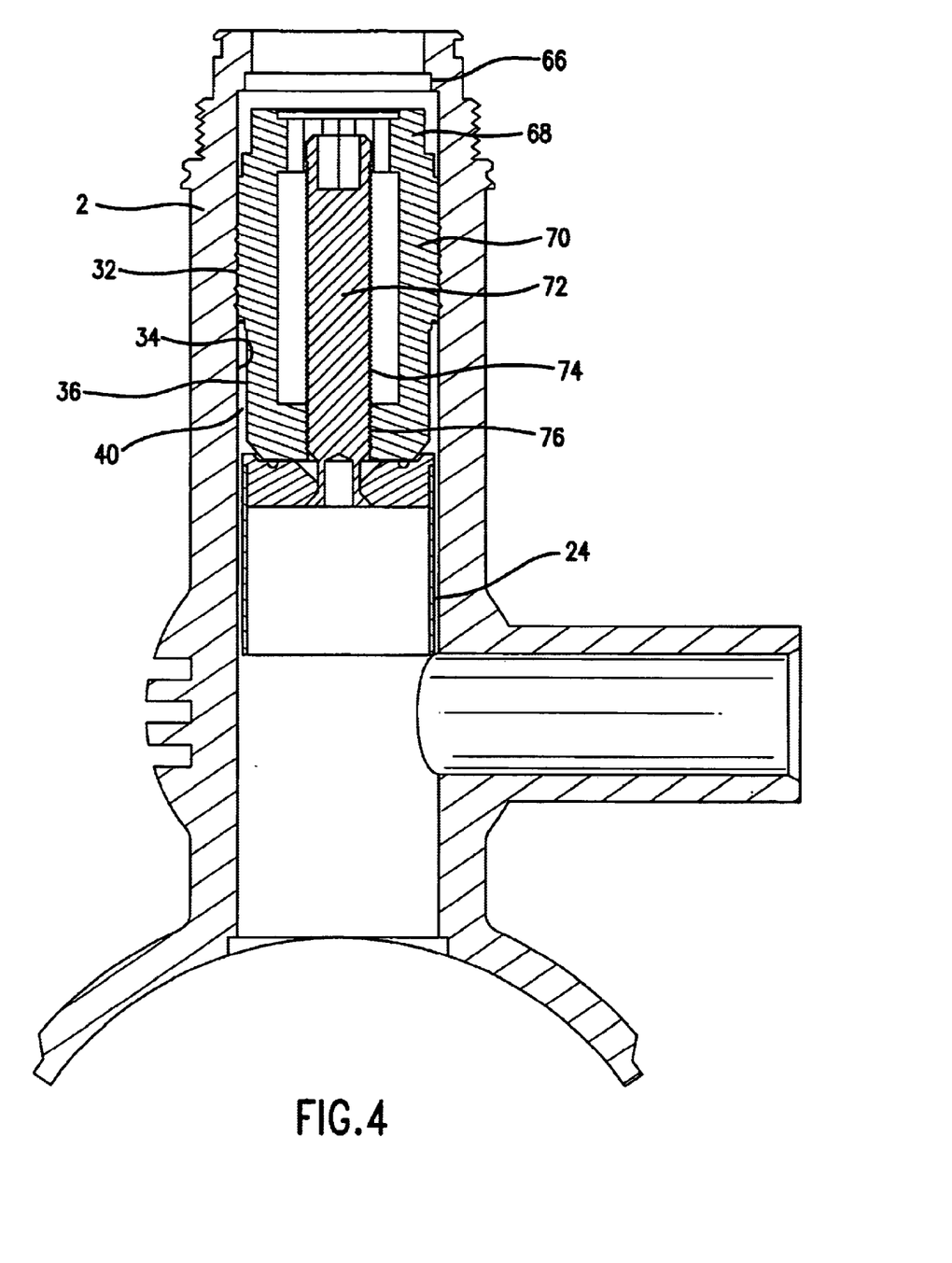
FIG. 4 shows a cross section through a further embodiment of the tapping valve having a sleeve in which the drill can be moved axially by a threaded spindle.

FIG. 4 shows an embodiment in which drill 24 is mounted indirectly in connection piece 2 by means of a sleeve 70. Sleeve 70 is provided with the special external thread 32 as described above. A threaded spindle 72 is non-rotatably coupled to drill 24. Its external thread 74 is configured as a fine-pitch thread and engages a corresponding internal thread 76 of sleeve 70. The upper end of sleeve 70 has an internal engagement area 68 for a screw-in tool. Furthermore, a stop area 66 with a reduced diameter is provided at the upper end of connection piece 2. The upper end of sleeve 70 is correspondingly configured as a safety stop.

Sleeve 70 is further provided with a smaller diameter cylindrical area 36 adjoining below special thread 32. As a result there is an annular gap 40 between cylindrical area 36 and cylindrical inner surface 34, as well as between drill 24 and the cylindrical inner surface 34 of connection piece 2. To manufacture the tapping valve, sleeve 70 is positioned in an injection mold and the plastic of the connection piece or the valve housing is then injection molded around it. At the time of manufacture, the sleeve is located higher than the position depicted in FIG. 4 to produce the stepped stop area 66 corresponding to the stepped configuration of the sleeve upper end. Drill 24 with threaded spindle 72 is subsequently screwed into the internal thread 76 of sleeve 70.

Figure 5:
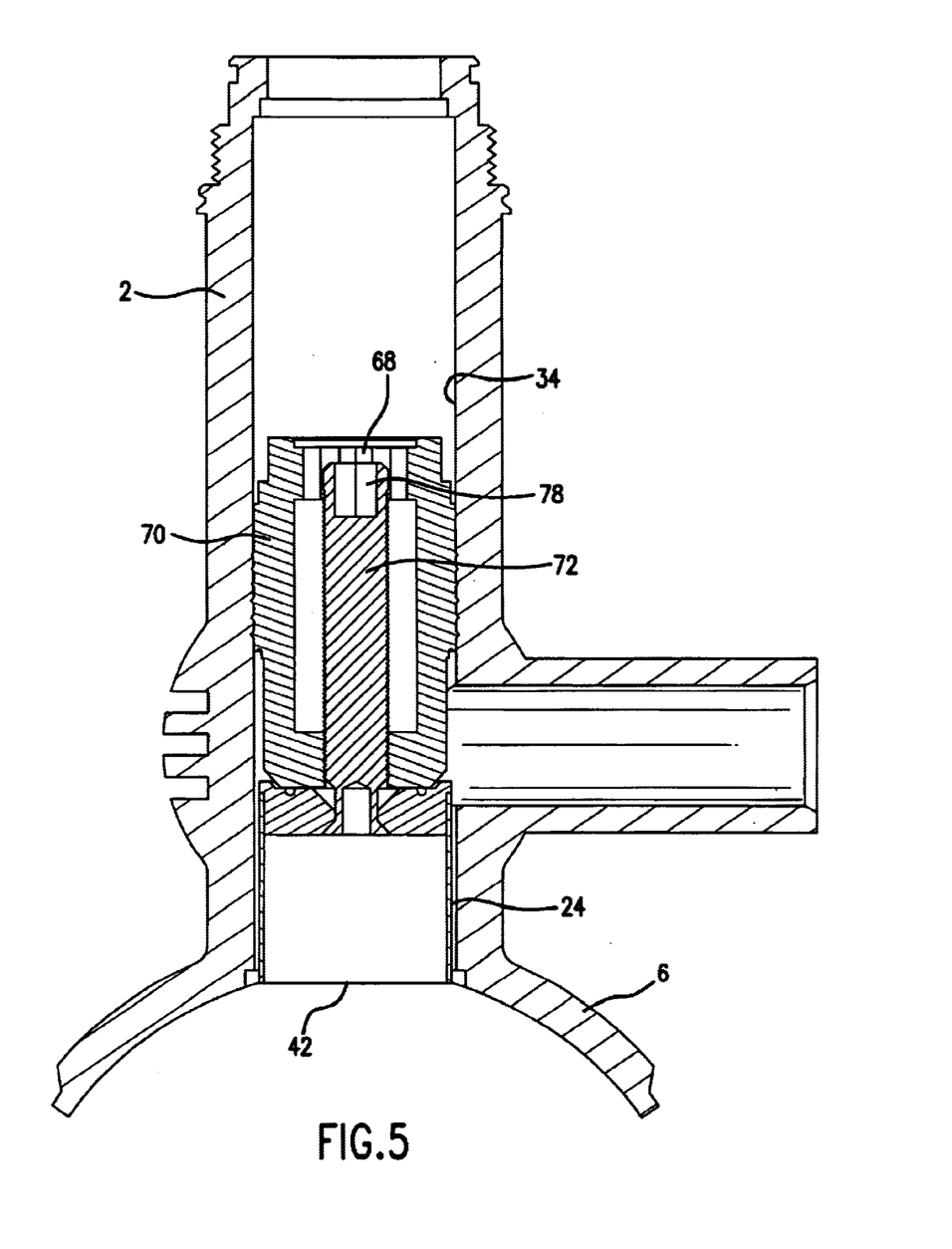
FIG. 5 shows the tapping valve according to FIG. 4, with the sleeve and drill depicted in a position prior to tapping a pipe.

FIG. 5 shows a cross section through the tapping valve of FIG. 4. Sleeve 70 together with drill 24 has now been moved axially downward, while simultaneously impressing an internal thread into the previously cylindrical area of inner surface 34, until the lower end 42 of drill 24 rests against the outer surface of a pipe, which has been welded to saddle piece 6. For the subsequent tapping of the pipe, the tool that was initially coupled to engagement area 68 is removed and another tool with an engagement area 78 is engaged with the upper end of threaded spindle 72. To tap the pipe, threaded spindle 72 is rotated, which causes drill 24 to be advanced axially via external thread 74 and internal thread 76, while sleeve 70 maintains the position assumed and depicted. During the actual tapping process, the torque applied via threaded spindle 72 is thus almost exclusively converted into tapping, especially since the torque component required to actuate the threaded connection between sleeve 70 and threaded spindle 72 is minimal in practice. It should be noted that for the actual tapping, no additional torque is required for cutting or impressing an internal thread into connection piece 2, so that the overall torque required for tapping is relatively small.

Figure 6:
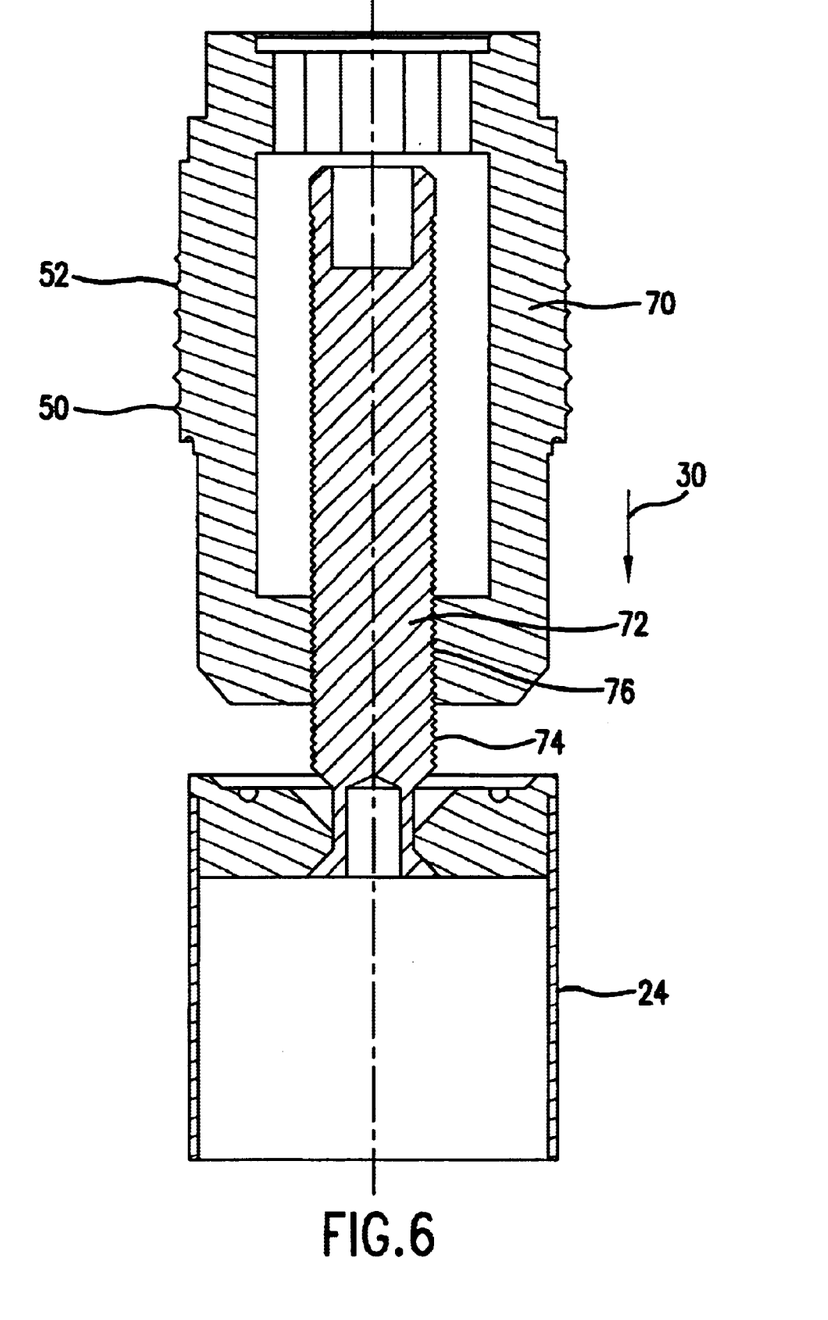
FIG. 6 shows the sleeve and drill according to FIG. 4.

FIG. 6 shows an enlargement of the drill and sleeve assembly including drill 24, threaded spindle 72 which is non-rotatably connected therewith, and sleeve 70, without the valve housing. The external thread 74 of threaded spindle 72 and the corresponding internal thread 76 of sleeve 70 are configured as normal fine-pitch threads, particularly metric ISO fine-pitch threads. Thus, the actual tapping of the pipe, during which drill 24 is moved axially downward relative to sleeve 70, requires little force or torque. As described above and shown in this figure, sleeve 70, in the direction of forward movement 30, has a first thread area 50 with a larger outside diameter than an adjoining second thread area 52 lying behind it in the direction of forward movement 30.

Figure 7:
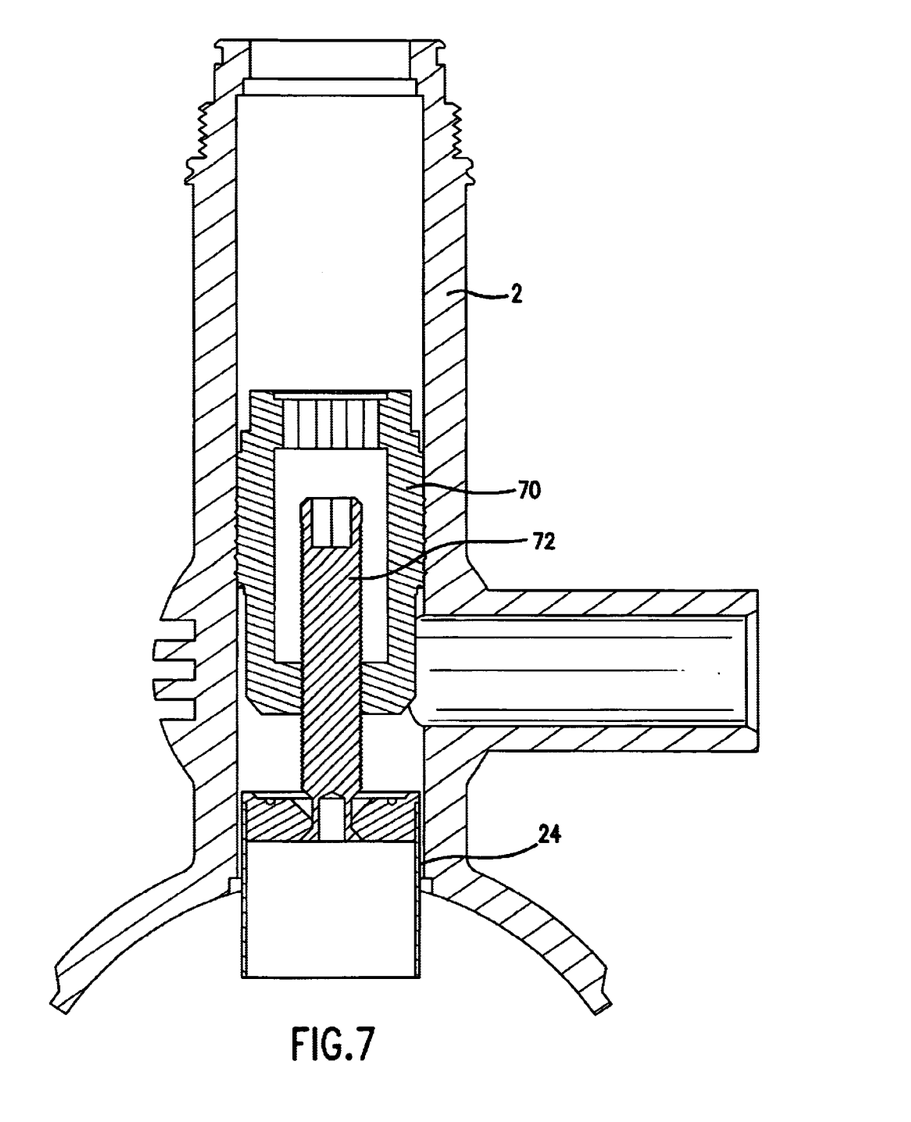
FIG. 7 shows the tapping valve of FIG. 4 with the drill depicted during tapping.

FIG. 7 shows the tapping valve with drill 24 in the position that it assumes during tapping of the pipe, or after completion of the tapping. Sleeve 70 is in the same axial position as shown in FIG. 5, while drill 24 by means of threaded spindle 72 is moved still further downward relative to sleeve 70 in the direction of forward movement 30.

Figure 8:
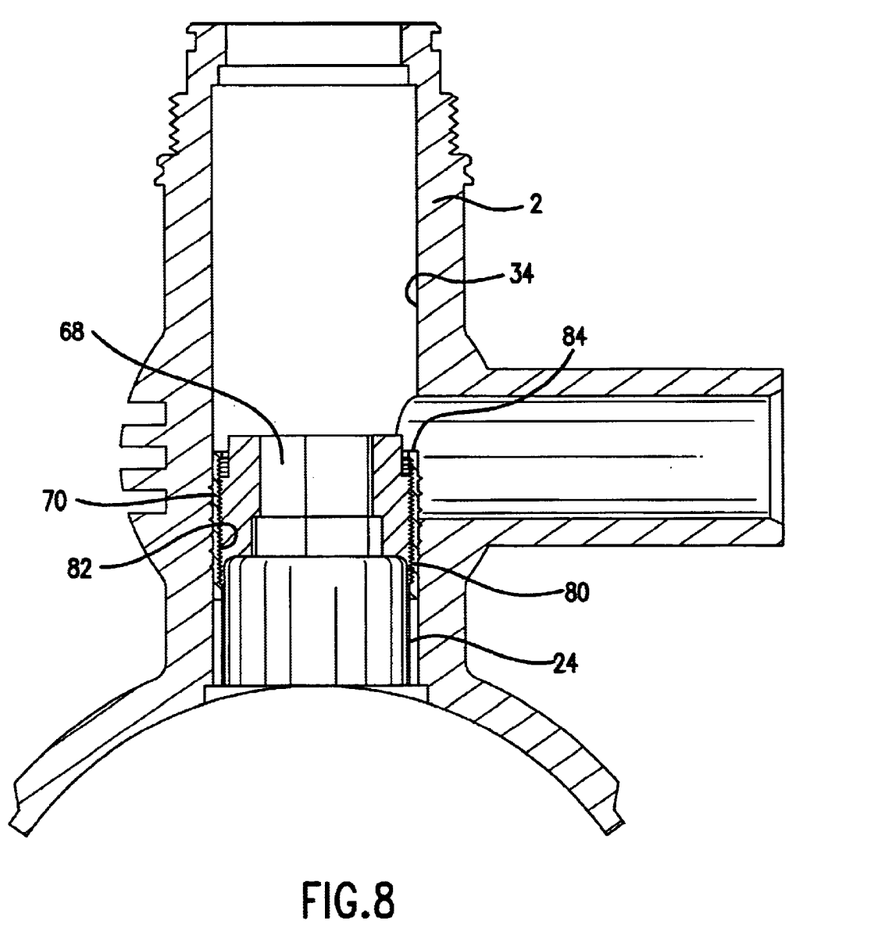
FIG. 8 is a further embodiment of the tapping valve with a sleeve that can receive the drill in telescoping fashion.

FIG. 8 shows a special embodiment of the inventive tapping valve with a telescoping assembly, which comprises sleeve 70 and drill 24. Due to the telescope-type engagement of drill 24 in sleeve 70, the axial component length of connection piece 2 is significantly reduced. This telescoping assembly is located at the lower end of connection piece 2, which contains cylindrical inner surface 34. The tapping valve was produced with the integrated, preferably thin-walled, sleeve 70 in this position. Drill 24 has an outside diameter that is approximately equal to the inside diameter of sleeve 70. Drill 24 also has an area with an external thread 80, which engages a corresponding internal thread 82 of sleeve 70. The threads 80, 82 are again configured as fine-pitch threads. At its upper end, drill 24 has an engagement area 68 for a tapping tool. To tap the pipe, only drill 24 is rotated axially downward, while sleeve 70 maintains the depicted lower position.

The telescoping assembly is preferably integrated in the housing when the housing is produced, i.e., the plastic housing is preferably injection molded around the drill and sleeve assembly. It is also within the scope of the invention to insert the telescoping assembly from below after production of the valve housing and screw it into the cylindrical inner surface of the connection piece or mandrel. The internal thread is impressed in the plastic of the valve housing by the two thread areas described above. It should be expressly noted here that for the other embodiments described above, the plastic housing likewise can be initially produced separately and the drill or sleeve with the inventive thread areas can be subsequently introduced into the connection piece.

Figure 9:
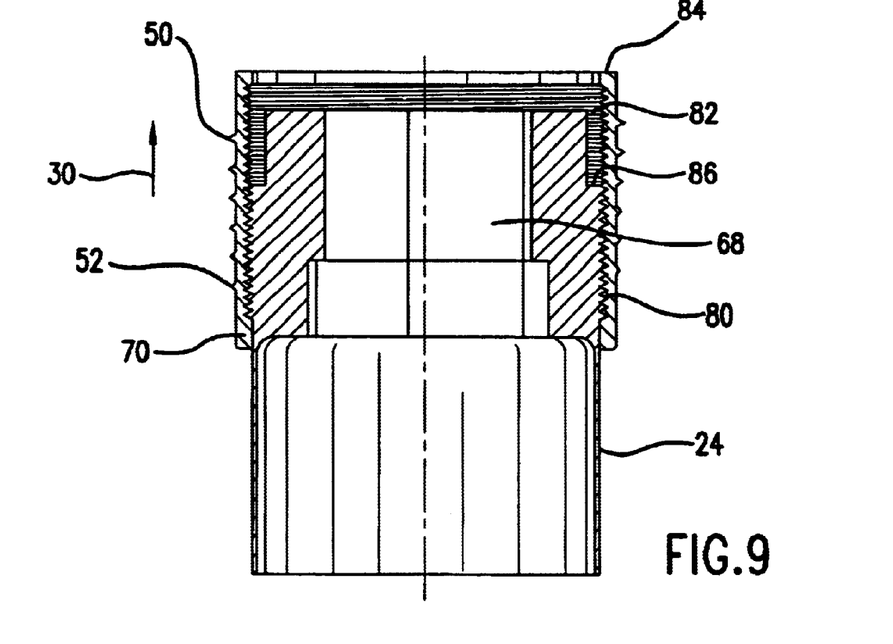
FIGS. 9 and 10, respectively, show a cross section and a perspective view of the sleeve and the drill of the tapping valve of FIG. 8.
Figure 10:
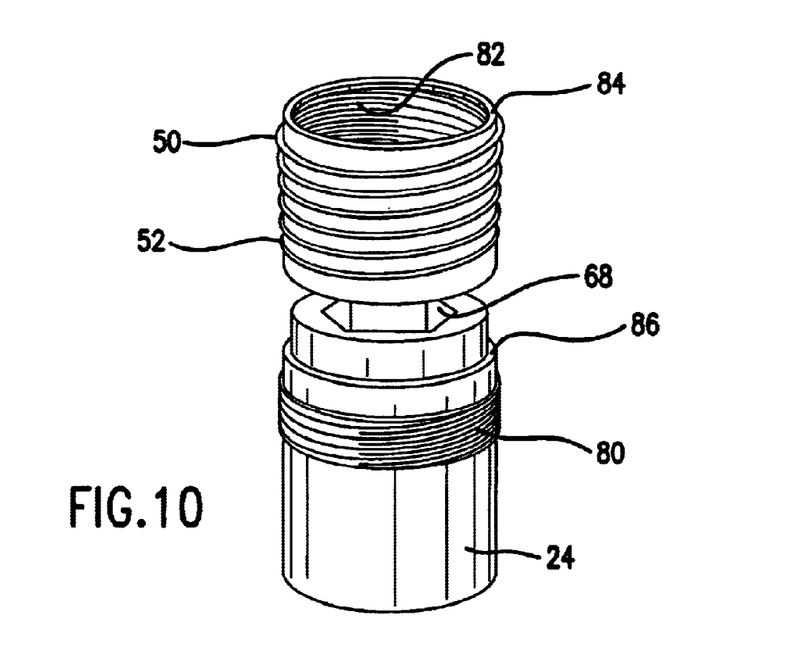

FIGS. 9 and 10 show sleeve 70 with drill 24, which in this case assumes the downwardly extended position for drilling. The external thread 80 of drill 24 and the corresponding internal thread 82 of the thin-walled sleeve 70 are clearly visible here. At its upper end, sleeve 70 has a radially inwardly directed annular collar or stop 84, which prevents drill 24 from being unscrewed in the upward direction. Drill 24 has a corresponding annular shoulder 86, which ultimately contacts stop 84 of sleeve 70 as drill 24 is rotated upwardly in the direction of arrow 30'. It should be noted expressly that in this embodiment the forward movement is upward toward the upper end of the connection piece in the direction of arrow 30'. The first thread area 50 of sleeve 70 is thus at the upper end of the sleeve, and the second thread area 52 with the smaller outside diameter adjoins it below.

Figure 11:
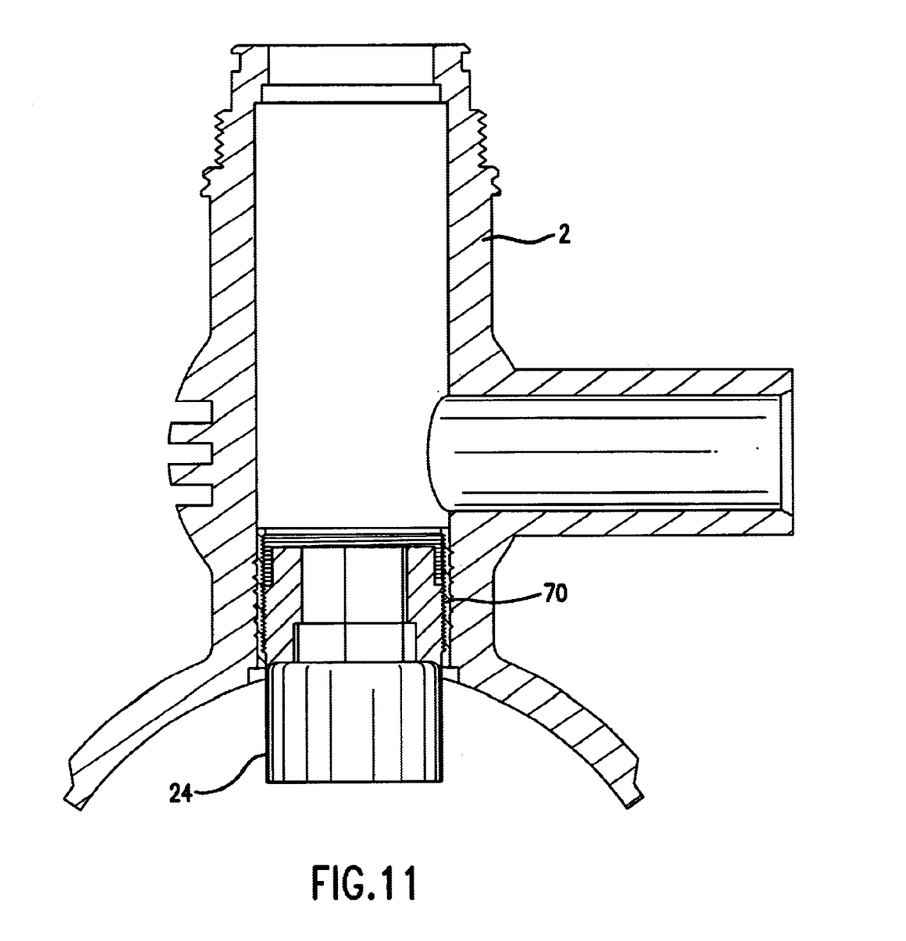
FIG. 11 shows the tapping valve according to FIG. 8 with the drill depicted in its position after tapping a pipe.

FIG. 11 shows the tapping valve with sleeve 70 maintaining its position shown in FIG. 8, while drill 24 has been rotated axially downward by means of the tapping tool in order to tap the pipe. It should be noted expressly that due to the configuration of the internal thread 82 of the sleeve and the corresponding external thread 80 of the drill, particularly as fine-pitch threads, drill 24 can be rotated relative to sleeve 70 with a significantly lower torque than sleeve 70 relative to the plastic of connection piece 2. As the drill is rotated in downward direction, sleeve 70 thus maintains the position it assumed during manufacture.

Figure 12:
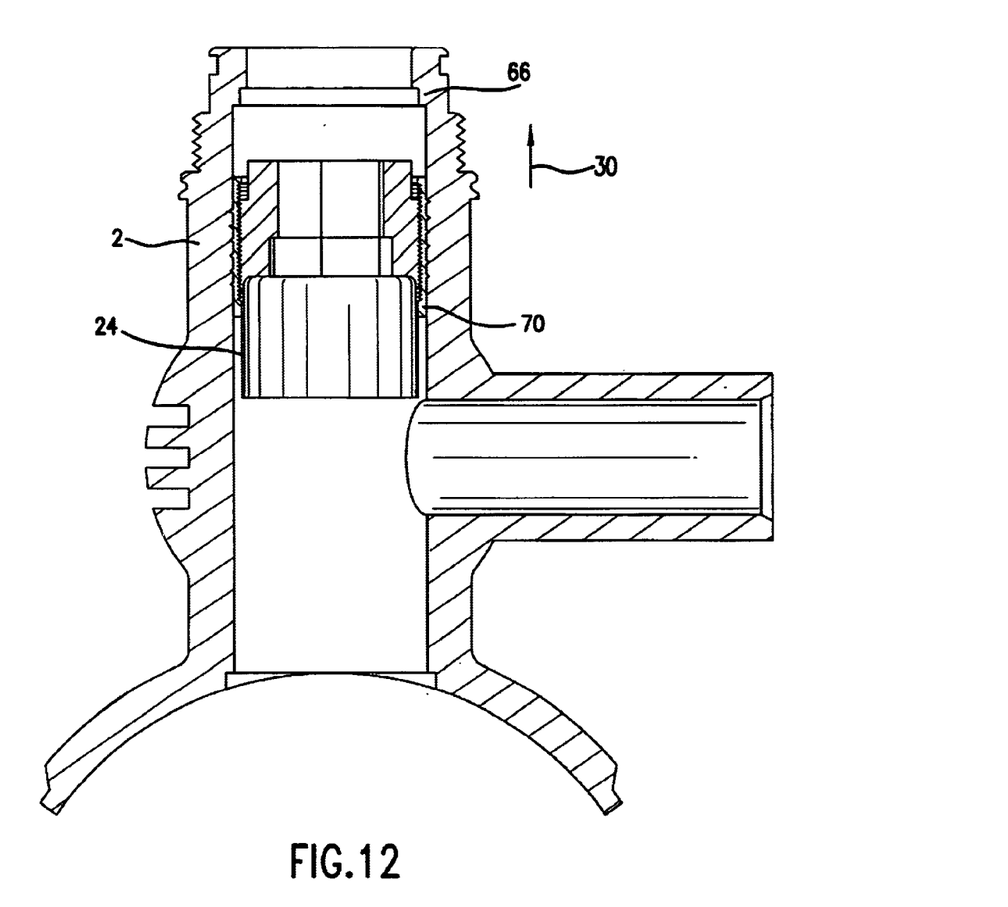
FIG. 12 shows the tapping valve according to FIG. 7, depicting the sleeve and the drill in the position after tapping and retraction.

FIG. 12 shows the tapping valve with the telescoping assembly, comprising drill 24 and sleeve 70, having been moved upwardly in the direction of the forward movement corresponding to arrow 30'. To this end, the tapping tool was rotated against the tapping direction of rotation, while drill 24 with its annular shoulder 86, which is described above with reference to FIGS. 9 and 10, first contacted stop or annular collar 84 of sleeve 70. With continued rotation in said direction, sleeve 70 was also moved upwardly. By means of thread areas 50, 52 arranged on the outer surface of the sleeve, the thread was impressed into the previously cylindrical inner surface of connection piece 2. The corresponding descriptions with reference to FIGS. 1 and 2 apply analogously. The inner stop area 66 at the upper end of connection piece 2 terminates the advance of the drill and sleeve assembly and reliably prevents complete unscrewing.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A tapping valve comprising a housing which can be connected to a pipe, and a connection piece with a drill arranged therein for tapping the pipe, wherein the connection piece has an initially cylindrical inner surface, and the drill or a sleeve in which the drill can be moved axially by a threaded connection, has an external thread which engages the inner surface of the connection piece, and rotation of the drill or sleeve in a forward direction causes the external thread on the drill or sleeve to form an internal thread in said inner surface, wherein a cylindrical portion of the drill or the sleeve forward of the external thread has an outside diameter smaller than an inside diameter of the inner surface of the connection piece, such than an annular gap exists between the cylindrical portion of the drill or sleeve and the inner surface of the connection piece, and the connection piece inner surface is initially unthreaded in regions not opposite the drill or sleeve external thread.

2. A tapping valve according to claim 1, wherein said housing is electrically welded to said pipe.

3. A tapping valve according to claim 1, wherein said external thread on the drill or sleeve comprises first, forward threaded area and an adjoining second, rear threaded area; said first threaded area having an outside diameter that is larger by a predetermined amount than the outside diameter of the second threaded area.

4. A tapping valve according to claim 3, wherein the diameter difference between the first and second threaded areas ranges from 0.3 to 0.8 mm.

5. A tapping valve according to claim 4, wherein the diameter difference between the first and second threaded areas ranges from 0.4 to 0.7 mm.

6. A tapping valve according to claim 5, wherein the diameter difference between the first and second threaded areas is about 0.5 mm.

7. A tapping valve according to claim 3, wherein the first threaded area comprises at least one turn that extends through a predetermined circumferential angle of approximately 360°.

8. A tapping valve according to claim 3, wherein the first threaded area comprises two turns which extend through a predetermined circumferential angle of approximately 720°.

9. A tapping valve according to claim 3, wherein the second threaded area has a substantially greater axial length than the first threaded area.

10. A tapping valve according to claim 3, wherein the second threaded area comprises at least four turns.

11. A tapping valve according to claim 1, wherein the connection piece comprises an upper stop region having an inside diameter smaller than the inside diameter of said inner surface, and the drill or sleeve is provided with a stop member engageable with said stop region.

12. A tapping valve according to claim 1, wherein after production of the tapping valve, the drill is initially disposed in an upper end area of the connection piece and can be moved toward a saddle piece of the housing for tapping into the pipe, whereby threads are formed in the initially threadless cylindrical inner surface of the connection piece.

13. A tapping valve according to claim 1, wherein said housing is a plastic housing and is injection molded around the drill during production of the tapping valve.

14. A tapping valve according to claim 1, wherein the sleeve has an internal thread which engages a mating external thread of a threaded spindle non-rotatably connected with the drill.

15. A tapping valve according to claim 14, wherein the sleeve internal thread and spindle external thread are fine-pitch threads.

16. A tapping valve according to claim 1, wherein the sleeve has an internal thread which engages a mating external thread on the drill.

17. A tapping valve according to claim 16, wherein the sleeve internal thread and spindle external thread are fine-pitch threads.

18. A tapping valve according to claim 1, wherein the sleeve and the drill are constructed as a telescoping assembly in which the drill is at least partially arranged interiorly of the sleeve.

19. A tapping valve according to claim 18, wherein during production of the tapping valve, the sleeve is initially arranged at a lower end of the connection piece, and after tapping, the sleeve and drill can be moved forward together inside connection piece toward the upper end of the connection piece.

20. A tapping valve according to claim 1, wherein the inner diameter of the initially unthreaded portions of the connection piece is essentially equal to an outer core diameter of the drill or sleeve.

\* \* \* \* \*